United States Patent
Wu et al.

(10) Patent No.: US 11,976,192 B2
(45) Date of Patent: May 7, 2024

(54) FLAME RETARDANT AND FULLY BIODEGRADABLE PLASTIC, MANUFACTURING METHOD OF THE SAME, AND APPLICATION OF THE SAME

(71) Applicants: HUIZHOU NORTHERN FOREST CO., LTD., Huizhou (CN); FOSHAN BIO-PLUS ADVANCED MATERIALS CO., LTD., Foshan (CN)

(72) Inventors: Yongsheng Wu, Foshan (CN); Jun Li, Foshan (CN); Yanzhi Li, Foshan (CN); Yehua Liu, Huizhou (CN)

(73) Assignees: HUIZHOU NORTHERN FOREST CO., LTD., Huizhou (CN); FOSHAN BIO-PLUS ADVANCED MATERIALS CO., LTD., Foshan (CN)

( * ) Notice: Subject to any disclaimer, the term of this patent is extended or adjusted under 35 U.S.C. 154(b) by 220 days.

(21) Appl. No.: 17/475,363

(22) Filed: Sep. 15, 2021

(65) Prior Publication Data

US 2022/0403160 A1  Dec. 22, 2022

(30) Foreign Application Priority Data

Jun. 22, 2021 (CN) .......................... 202110690531.8

(51) Int. Cl.
| | |
|---|---|
| *C08L 67/03* | (2006.01) |
| *B29B 9/02* | (2006.01) |
| *B29B 9/16* | (2006.01) |
| *C08K 3/22* | (2006.01) |
| *C08K 5/00* | (2006.01) |
| *C08K 5/06* | (2006.01) |
| *C08L 67/04* | (2006.01) |

(52) U.S. Cl.
CPC ................ *C08L 67/03* (2013.01); *B29B 9/02* (2013.01); *B29B 9/16* (2013.01); *C08K 3/2279* (2013.01); *C08K 5/005* (2013.01); *C08K 5/0066* (2013.01); *C08K 5/06* (2013.01); *C08L 67/04* (2013.01); *C08L 2201/02* (2013.01); *C08L 2201/06* (2013.01); *C08L 2201/08* (2013.01)

(58) Field of Classification Search
CPC ...... C08L 67/03; C08L 67/04; C08L 2201/02; C08L 2201/06; C08L 2201/08; C08K 5/0066; C08K 5/005; C08K 5/06; C08K 3/2279; B29B 9/02; B29B 9/16
See application file for complete search history.

(56) References Cited

U.S. PATENT DOCUMENTS 4,148,955 A * 4/1979 Breitenfellner ............ C08J 5/18
428/156

FOREIGN PATENT DOCUMENTS

| CN | 116157449 A | * | 5/2023 |
| CN | 116285261 A | * | 6/2023 |
| WO | WO-2021175617 A1 | * | 9/2021 |

* cited by examiner

*Primary Examiner* — Robert D Harlan (57) ABSTRACT

Disclosed are a flame retardant and fully biodegradable plastic, a manufacturing method of the same, and an application of the same. A flame retardant and fully biodegradable plastic, prepared from following components with amount by weight: a biodegradable plastic: 70-95 parts; a flame retardant: 1-15 parts; an anti-oxidant: 0-1 part; a lubricant: 0-2 parts; a compatibility agent: 0-3 parts; and a color powder: 0-5 parts; wherein the biodegradable plastic consists of PBS, PBAT, and PLA, and the weight ratio thereof is PLA:PBAT:PBS=1:(1-4):(0-1); the flame retardant consists of decabromodiphenyl ether and diantimony trioxide, and the weight ratio thereof is decabromodiphenyl ether: diantimony trioxide=1:(1-10).

4 Claims, 7 Drawing Sheets

FLAME RETARDANT AND FULLY BIODEGRADABLE PLASTIC, MANUFACTURING METHOD OF THE SAME, AND APPLICATION OF THE SAME

TECHNICAL FIELD

The present disclosure relates to the field of flame retardant and biodegradable plastic technologies, and in particular to a flame retardant and fully biodegradable plastic, a manufacturing method of the same, and an application of the same.

BACKGROUND

A plastic ornament is a decorative product and accessory applied to artificial plastic Christmas rattans (decorative parts of Christmas trees), Christmas wreaths (decorative parts of Christmas trees), artificial plastic grass, artificial plastic flowers, light ornaments and other decorative products and accessories for home and garden use. The plastic ornament in the prior art is a conventional plastic made of polyvinyl chloride (PVC), polyethylene (PE) and other materials blended with a flame retardant. The PVC and PE are petroleum-based sources, which deviate from the sustainable development principle advocated by China and the world. Moreover, the PVC and PE are not biodegradable, such that recycling and treatment of waste plastics are costly and polluting to the environment. When PVC is treated by incineration, toxic gases such as hydrogen chloride and dioxins will be released. A biodegradable plastic has characteristics of environmental protection and low ecological pressure, which is a superior solution to replace the traditional plastics such as PVC and PE. However, a fully biodegradable plastic is poorly compatible with the flame retardant, and the performance of the blended material is significantly reduced and cannot meet the product performance requirements (including impact strength, tensile strength, etc.).

In addition, the PVC material of the conventional plastic ornament is usually pressed to prepare a thin sheet, which has poor stability of sheet thickness control, complicated process, low efficiency and high comprehensive cost. The production process and application of a flame retardant and fully biodegradable plastic in the field of plastic ornaments are at a primitive stage of exploration and have not been promoted and applied. Therefore, the present disclosure is aimed to explore the innovative production process of the flame retardant and fully biodegradable plastic, for solving the above problems of traditional process, efficiency and comprehensive cost.

SUMMARY OF THE DISCLOSURE

To overcome the shortcomings of the prior art, a first objective of the present disclosure is to provide a flame retardant and fully biodegradable plastic. Conventional plastics such as PVC and PE are not biodegradable and contain harmful substances to human body such as plasticizers. Bioplastics are difficult to achieve flame retardation, and the compatibility of a flame retardant with a bioplastic is poor. The present disclosure addresses the above-mentioned shortcomings and provides a flame retardant and fully biodegradable plastic that can meet the performance and cost requirements of plastic ornaments.

A second objective of the present disclosure is to provide a method for manufacturing the flame retardant and fully biodegradable plastic. The flame retardant and fully biodegradable plastic provided by the present disclosure is applied with a screw extrusion method to manufacture sheet and filamentary materials, and with an injection molding machine combined with a mold to manufacture one-piece materials with a variety of shapes. By virtue of the variety of producing processes, the above process, efficiency, comprehensive cost problems may be solved.

A third objective of the present disclosure is to provide an application of the flame retardant and fully biodegradable plastic, specifically the preparation of plastic ornaments and its preparation method using the flame retardant and fully biodegradable plastic, and the finished ornaments made by the preparation method.

The first objective of the present disclosure is achieved with the following technical solutions: a flame retardant and fully biodegradable plastic, prepared from following components with amount by weight:

a biodegradable plastic: 70-95 parts;
a flame retardant: 1-15 parts;
a anti-oxidant: 0-1 part;
a lubricant: 0-2 parts;
a compatibility agent: 0-3 parts; and
a color powder: 0-5 parts;
wherein the biodegradable plastic consists of PBS, PBAT, and PLA, and the weight ratio thereof is PLA:PBAT:PBS=1:(1-4):(0-1); the flame retardant consists of decabromodiphenyl ether and diantimony trioxide, and the weight ratio thereof is decabromodiphenyl ether:diantimony trioxide=1:(1-10).

Further, the flame retardant and fully biodegradable plastic is prepared from following components with amount by weight:

the biodegradable plastic: 80-95 parts;
the flame retardant: 1-10 parts;
the anti-oxidant: 0.2-0.5 part;
the lubricant: 0.1-0.4 part;
the compatibility agent: 0.3-1 part; and
the color powder: 0.5-5 parts;
wherein the biodegradable plastic consists of PBS, PBAT, and PLA, and the weight ratio thereof is PLA:PBAT:PBS=1:(1-2.5):(0.2-0.5); the flame retardant consists of decabromodiphenyl ether and diantimony trioxide, and the weight ratio thereof is decabromodiphenyl ether:diantimony trioxide=1:(1-5).

Further, the anti-oxidant is selected from an anti-oxidant 1010 or an anti-oxidant 1076.

Further, the lubricant is selected from at least one of stearic acid, butyl stearate, oleic acid amide, ethylenebis-stearamide, paraffin wax, and polyethylene wax.

Further, the compatibility agent is selected from at least one of PE-g-ST, PP-g-ST, ABS-g-MAH, PE-g-MAH, PP-g-MAH, EVA, and EBA.

The second objective of the present disclosure is achieved with the following technical solutions: a method for manufacturing a flame retardant and fully biodegradable plastic, comprising:

1) Formulation of raw materials: blending the PBS, PBAT and PLA to prepare the biodegradable plastic;
2) Blending: blending the biodegradable plastic, the flame retardant, the anti-oxidant, lubricant and the compatibility agent; wherein the flame retardant consists of decabromodiphenyl ether and diantimony trioxide; and
3) Extrusion and granulation: performing extrusion and granulation through a twin-screw melt extruder, and obtaining a pulling strip; cooling the pulling strip in water; performing granule-cutting; drying to obtain a prepared material; wherein a notched impact strength of the prepared material is greater than 8 KJ/m$^2$, and the prepared material is the flame-retardant all-biodegradable plastic.

Further, in 1), the weight ratio for preparing the biodegradable plastic is PLA:PBAT:PBS=1:(1-4):(0-1); in 2), the weight ratio of the flame retardant is decabromodiphenyl ether:diantimony trioxide=1:(1-10); in 3), the temperature of a rear section of a screw of the twin-screw extruder is set at 150-200° C.

The third objective of the present disclosure is achieved with the following technical solutions: an application of a flame retardant and fully biodegradable plastic, wherein the flame retardant and fully biodegradable plastic is configured to prepare an artificial plastic Christmas tree, an artificial plastic Christmas rattan, a Christmas wreath, artificial plastic grass, an artificial plastic flower, a light ornament, and a garden ornament.

Further, a stimulation leaf of the artificial plastic Christmas tree, Christmas rattan and Christmas wreath are prepared with an extrusion method, and a method for preparing the artificial plastic Christmas tree, Christmas rattan and Christmas wreath comprises:
  (1) Sheet making and cutting: extruding and drawing the flame retardant and fully biodegradable plastic through a single-screw or twin-screw sheet extruder with a screw temperature of 150-200° C. to obtain a sheet, wherein the thickness of the sheet is arbitrarily adjustable between 0.05 mm and 0.6 mm with a thickness error of ±5%; precisely splitting and forming the extruded sheet according to a designed length and width scale through a millimeter-scale sheet splitting machine;
  (2) Manufacturing the simulation leaf: before shaping and forming, preheating the sheet to 60-120° C.; combining the precisely split and formed sheet with a millimeter grade iron wire with a strip puller to obtain a combined material; cutting the combined material to obtain a cut material with a cut plastic such as a fine sheet, a wire, a strip or a stereo shaped plastic through a cutter installed on a cutting machine according to a preset width of a final plastic ornament, while driving the iron wire and the cut plastic to rotate through a motor of the strip puller to produce the stimulation leaf; or
  Manufacturing the simulation leaf: before shaping and forming, preheating the sheet to 60-120° C.; melting the sheet and drawing the melted sheet into a sink for cooling through a wire drawing machine to obtain a wire-shaped plastic; driving an iron wire and the wire-shaped plastic to rotate through a motor of a strip puller to produce the stimulation leaf; and
  (3) Branch production and assembly: taking the simulation leaf, tying the simulation leaf and a wire in one through a branch tying machine or a branch rolling machine to obtain a branch plastic ornament; and stamping and combining the branch plastic ornament to obtain the Christmas tree, Christmas rattan, and Christmas wreath with the stimulation leaf.

Further, a stimulation leaf of the Christmas rattan, Christmas wreath, artificial plastic grass, and artificial plastic flower are prepared with an injection molding method, and a method for preparing the Christmas rattan, Christmas wreath, artificial plastic grass, and artificial plastic flower comprises:
  (1) Simulation leaf production: importing the flame retardant and fully biodegradable plastic as a pellet raw material into an injection molding machine, installing different shapes of simulation leaf molds, adjusting a screw setting temperature of the injection molding machine to be 170-220° C., and a pressure to be 50-120 Bar; filling the molds with water and cooling; obtaining various shapes of the simulation leaves by injection molding, wherein the shapes of the molds comprise sheet, wire, strip, and stereo shape; wherein while importing the flame retardant and fully biodegradable plastic, an iron wire is imported such that the flame retardant and fully biodegradable plastic combines with the iron wire after melted, while injection molding, to obtain the simulation leaves; the thickness of the simulation leaves is adjustable from 0.01 mm to 100 mm, with a thickness error of ±5%; and
  (2) Branch production and assembly: taking the simulation leaf, tying the simulation leaf and a wire in one through a branch tying machine or branch rolling machine to obtain a branch plastic ornament; and stamping and combining the branch plastic ornament to obtain the artificial plastic Christmas tree, Christmas rattan, Christmas wreath, artificial plastic grass, and artificial plastic flower with the stimulation leaves.

Compared with the prior art, the beneficial effects of the present disclosure are.
  (1) By selecting environmentally friendly special performance flame retardants and additives and blending with bioplastics, the problem of compatibility between bioplastics and flame retardants is solved, and the material properties can be maintained while meeting the requirements of flame retardant grade, realizing the production of the flame retardant and fully biodegradable plastic, avoiding the hazards caused by conventional plastic ornaments due to the necessity of using plasticizers, and fully meeting the comprehensive performance requirements of plastic ornaments.
  (2) The prepared flame retardant and fully biodegradable plastic can reach UL94 HB to V2 level in the national standard (in China); the relative decomposition rate of the material can reach more than 90%, which meets the domestic (in China) and international standards and requirements for industrial composting degradation; the material can withstand the temperature not higher than 60° C. without deformation; and the material can be maintained for more than 2 years with perfect ornamental properties under the indoor conditions of daily life.
  (3) In addition, by preferentially adopting the one-piece forming process of extrusion sheeting and injection mold, the sheet thickness and scale can be precisely controlled, and the resulting material is stable and efficient.
  (4) The prepared flame retardant and fully biodegradable plastic is applied to make but not limited to: artificial plastic Christmas trees, Christmas rattans, Christmas wreaths, artificial plastic grass, artificial plastic flowers, light ornaments and other decorative products and accessories for home and gardening use.

DETAILED DESCRIPTION

The present disclosure will be further described in connection with the accompanying drawings and the specific embodiments. It should be noted that, without conflict, new embodiments may be formed by any combination between the embodiments described below or between the technical features.

In the present disclosure, all parts and percentages are in weight units if not specifically referred to, and an equipment and raw materials used, etc., are commercially available or commonly used in the art. The methods in the following embodiments, unless otherwise specified, are conventional methods in the art.

Conventional plastics such as PVC and PE are not biodegradable and contain harmful substances to human body such as plasticizers. Bioplastics are difficult to achieve flame retardation, and the compatibility of a flame retardant with a bioplastic is poor. The present disclosure addresses the above-mentioned shortcomings and provides a flame retardant and fully biodegradable plastic that can meet the performance and cost requirements of plastic ornaments.

A flame-retardant all-biodegradable plastic is prepared from the following components by weight:
A biodegradable plastic: 70-95 parts;
A flame retardant: 1-15 parts;
A anti-oxidant: 0-1 part;
A lubricant: 0-2 parts;
A compatibility agent: 0-3 parts; and
A color powder: 0-5 parts.

The biodegradable plastic consists of PBS, PBAT, and PLA. The weight ratio thereof is PLA:PBAT:PBS=1:(1-4):(0-1). The flame retardant consists of decabromodiphenyl ether and diantimony trioxide. The weight ratio thereof is decabromodiphenyl ether:diantimony trioxide=1:(1-10).

In some embodiments, the flame-retardant all-biodegradable plastic is prepared from the following components by weight:
The biodegradable plastic: 80-95 parts;
The flame retardant: 1-10 parts;
The anti-oxidant: 0.2-0.5 part;
The lubricant: 0.1-0.4 part;
The compatibility agent: 0.3-1 part; and
The color powder: 0.5-5 parts.

The biodegradable plastic consists of PBS, PBAT, and PLA. The weight ratio thereof is PLA:PBAT:PBS=1:(1-2.5):(0.2-0.5). The flame retardant consists of decabromodiphenyl ether and diantimony trioxide. The weight ratio thereof is decabromodiphenyl ether:diantimony trioxide=1:(1-5).

The biodegradable plastic required for the present disclosure may be at least one of biodegradable materials such as polylactic acid (PLA), polybutylene terephthalate (PBAT), polybutylene succinate (PBS), polycaprolactone (PCL), etc. While selecting from the biodegradable plastic materials, PLA is a rigid material with high tensile strength, but high hardness and poor impact resistance, PBAT and PCL are soft plastics with excellent impact resistance but low tensile strength; the performance of PBS is between PLA and PBAT, with the special advantage of good heat resistance and the special disadvantage of poor aging resistance; in addition, the price of PCL is about twice as high as PLA and PABAT, therefore the disadvantage is obvious from the economic point of view. Artificial plastic Christmas leaves and other plastic ornaments require materials with excellent flexibility and moderate hardness, therefore it is necessary to apply the above materials together to obtain a comprehensive performance (including impact strength, tensile strength, etc.) and price required for the ornaments.

Existing flame retardants include organic flame retardants and inorganic flame retardants. The organic flame retardants include: 1) chlorine-based flame retardants, such as chlorinated paraffin, perchlorinated cyclopentane; 2) bromine-based flame retardants, such as decabromodiphenyl ether, tetrabromobisphenol A, pentabromotoluene and hexabromocyclododecane; 3) phosphorus-based flame retardants, including triphenol phosphate, xylene phosphate ester, butylbenzene phosphate, ammonium phosphate, ammonium polyphosphate, etc. The inorganic flame retardants include aluminum hydroxide, magnesium hydroxide, red phosphorus, diantimony trioxide, etc. The flame retardant efficiency of various flame retardants in different plastic materials varies greatly. In some plastics requiring high flame retardancy (such as PP material for electrical appliances requiring flame retardancy V-0 level), the amount of flame retardant is even added to more than 30%, which greatly reduces the mechanical properties of the material itself. Moreover, the safety and environmental protection of various flame retardants are also different, and the present disclosure is required to select a flame retardant that is safer to human beings and less harmful to the environment. After a lot of experiments, the present disclosure applies a combination of a brominated flame retardant and an inorganic flame retardant, and minimizes the amount of the flame retardant added to reduce the negative impact of the flame retardant on material performance on the premise of achieving a flame retardancy UL94 HB level.

In some embodiments, the anti-oxidant is selected from an anti-oxidant 1010 or an anti-oxidant 1076.

In some embodiments, the lubricant is selected from at least one of stearic acid, butyl stearate, oleic acid amide, ethylenebis-stearamide (vinyl bis-stearamide), paraffin wax, and polyethylene wax.

In some embodiments, the compatibility agent is selected from at least one of PE-g-ST, PP-g-ST, ABS-g-MAH, PE-g-MAH, PP-g-MAH, EVA, and EBA.

In some embodiments, to achieve a desired decorative color of the plastic ornament, the environmentally friendly color powder is added to the biodegradable material to meet various color requirements.

A method for preparing the flame-retardant all-biodegradable plastic include operations as followed.
1) Formulation of raw materials: the formulated amount of PBS, PBAT and PLA are blended to prepare the biodegradable plastic.
2) Blending: the formulated amount of the biodegradable plastic, the flame retardant, the anti-oxidant, lubricant and the compatibility agent are blended; the flame retardant consists of decabromodiphenyl ether and diantimony trioxide.
3) Extrusion and granulation: extrusion and granulation are performed through a twin-screw melt extruder; the temperature of a rear section of a screw of the twin-screw extruder is set at 150-200° C.; a resulting pulling strip is cooled in water; granule-cutting is performed; drying is performed; a notched impact strength of the prepared material is greater than 8 KJ/m$^2$, and the prepared material is the flame-retardant all-biodegradable plastic.

To meet the material in the process of preparing plastic ornament punching, curling, shaping and other processes without breaking and the final product in the transportation, installation, use of the process to withstand the vibration, impact, impact, bending and other external forces, the notched impact strength of the prepared material is required to be greater than 8 KJ/m$^2$. If the notched impact strength of the material is less than 8 KJ/m$^2$, the ornament will be very likely to be cracked, broken, and become defective or scrap during manufacturing, transportation, and use. The required material notch impact strength is obtained by adjusting the relative ratio of PLA, PBAT and PBS.

The existing traditional plastic ornament is made of PVC material, and the PVC material is pressed to prepare a thin sheet, which has poor stability of sheet thickness control, complicated process, low efficiency, and high comprehensive cost. Therefore, the flame retardant and fully biodegradable plastic provided by the present disclosure is applied with a screw extrusion method to manufacture sheet and filamentary materials, with a wire drawing machine to manufacture wire-shaped materials, and with an injection molding machine combined with a mold to manufacture one-piece materials with a variety of shapes. By virtue of the variety of producing processes, the above process, efficiency, comprehensive cost problems may be solved.

The prepared flame retardant and fully biodegradable plastic of the present disclosure is applied to make, but not limited to: artificial plastic Christmas trees, artificial plastic Christmas rattans, Christmas wreaths, artificial plastic grass, artificial plastic flowers, light ornaments and other decorative products and accessories for home and garden use. Among the above decorations, such as Christmas trees, light strings may be arranged after the products are formed to make the products more ornamental.

In the following, the artificial plastic Christmas tree, Christmas rattan and Christmas wreath are taken as examples to illustrate the practical application of the flame retardant and fully biodegradable plastic of the present disclosure.

A first manufacturing method of the artificial plastic Christmas tree, Christmas rattan, and Christmas wreath (whose specific products' plastic simulation leaves are manufactured with the extrusion method) specifically includes the following operations.

(1) Sheet making and cutting: extruding and drawing the flame retardant and fully biodegradable plastic through a single-screw or twin-screw sheet extruder with a screw temperature of 150-200° C. to obtain a sheet, wherein the thickness of the sheet is arbitrarily adjustable between 0.05 mm and 0.6 mm with a thickness error of ±5%; precisely splitting and forming the extruded sheet according to a designed length and width scale through a millimeter-scale sheet splitting machine;

(2) A first method for manufacturing a simulation leaf: before shaping and forming, preheating the sheet to 60-120° C.; combining the precisely split and formed sheet with a millimeter grade iron wire with a strip puller to obtain a combined material; cutting the combined material to obtain a cut material with a cut plastic such as a fine sheet, a wire, a strip or a stereo shaped plastic through a cutter installed on a cutting machine according to a preset width of a final plastic ornament, while driving the iron wire and the cut plastic to rotate through a motor of the strip puller to produce a stimulation leaf;

Alternatively, a second method for manufacturing a simulation leaf: before shaping and forming, preheating the sheet to 60-120° C.; melting the sheet and drawing the melted sheet into a sink for cooling through a wire drawing machine to obtain a wire-shaped plastic; driving an iron wire and the wire-shaped plastic to rotate through a motor of a strip puller to produce a stimulation leaf;

(3) Branch production and assembly: taking the simulation leaf, tying the simulation leaf and a wire in one through a branch tying machine or branch rolling machine to obtain a branch plastic ornament; and stamping combining the branch plastic ornament to obtain the Christmas tree, Christmas rattan, and Christmas wreath with the stimulation leaf.

A second manufacturing method of the artificial plastic Christmas tree, Christmas rattan, Christmas wreath, artificial plastic grass, and artificial plastic flower (whose specific products' plastic simulation leaves are manufactured with the injection molding method) specifically includes the following operations.

(1) Simulation leaf production: importing a flame retardant and fully biodegradable plastic pellet raw material into an injection molding machine, installing different shapes of simulation leaf molds, adjusting a screw setting temperature of the injection molding machine to be 170-220° C., and a pressure to be 50-120 Bar; filling the molds with water and cooling; obtaining various shapes of simulation leaves by injection molding, wherein the shapes of the molds include but are not limited to sheet, wire, strip, and stereo shape. In addition, while importing the flame retardant and fully biodegradable plastic pellet raw material, an iron wire may also be imported, such that the flame retardant and fully biodegradable plastic pellet raw material combines with the iron wire after melted, while injection molding, to obtain the simulation leaves; the thickness of the simulation leaves is adjustable from 0.01 mm to 100 mm, with a thickness error of ±5%;

(2) Branch production and assembly: taking the simulation leaf, tying the simulation leaf and a wire in one through a branch tying machine or branch rolling machine to obtain a branch plastic ornament; and stamping combining the branch plastic ornament to obtain the artificial plastic Christmas tree, Christmas rattan, Christmas wreath, artificial plastic grass, and artificial plastic flower with the stimulation leaves.

The conventional plastic ornament material is mainly PVC, and the manufacturing method thereof is two-step (calendering into a sheet and then shaping it into a secondary shape), while the flame retardant and fully biodegradable plastic of the present disclosure may be manufactured in two-step (extruded into a sheet and then shaped into a secondary shape, and the sheet needs to be preheated to 60-120° C. before shaping), or may be injection molded in one-step. The specific implementation of the above two-step methods vary greatly, with the flame retardant and fully biodegradable plastic being an extruded sheet that is preheated before shaping. The present disclosure can precisely control the thickness and scale of the sheet and is stable, efficient and low cost by using an extruded sheet or injection mold one-piece forming process.

The following are specific embodiments of the present disclosure. The raw materials, equipment, etc. used in the following embodiments can be obtained by purchase except for special limitations.

Embodiments 1-4, Comparisons 1-2 and Application Examples 1-6

The raw materials are weighed according to the ratios of Embodiments 1-4 and Comparisons 1-2 in Table 1, respectively, and the plastic ornament is made according to the manufacturing method after Table 1, corresponding to the obtained plastic ornament of different embodiments, as detailed in Table 1.

Figure 1:
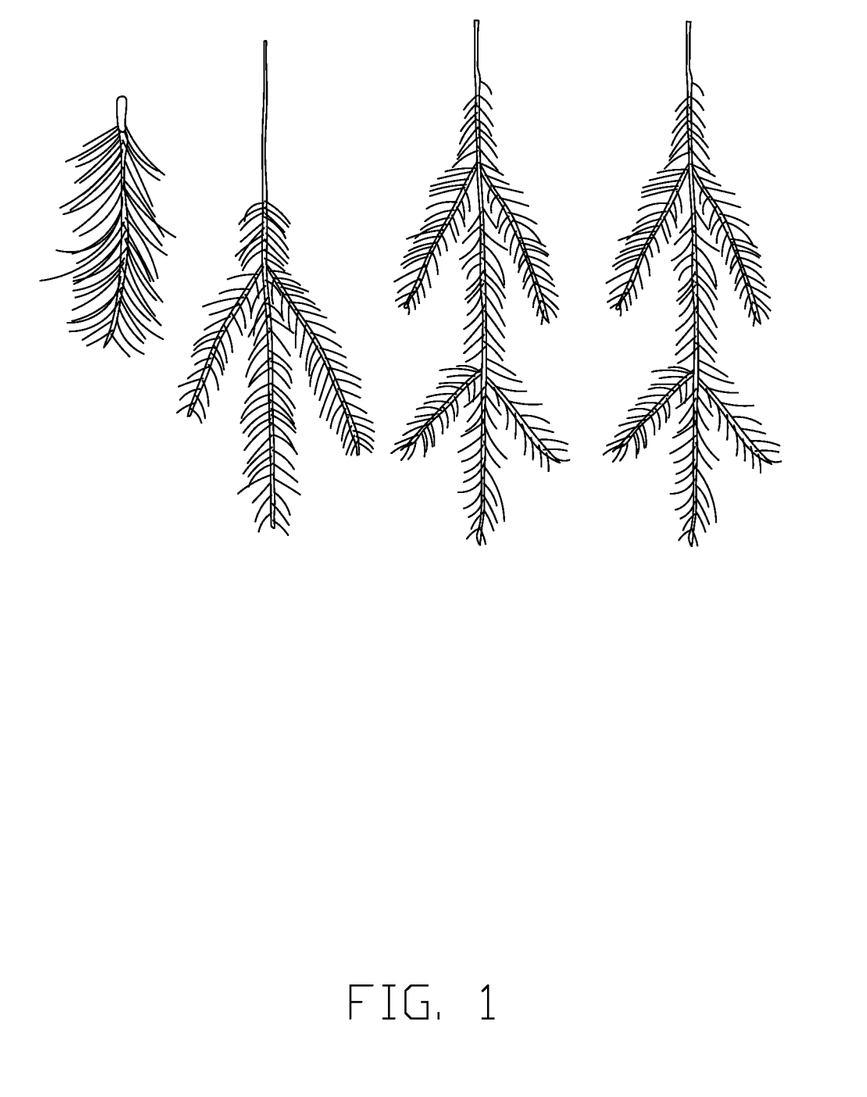
FIG. 1 is a schematic view of stimulated leaves applied to an artificial plastic Christmas tree according to an embodiment of the present disclosure.
Figure 2:
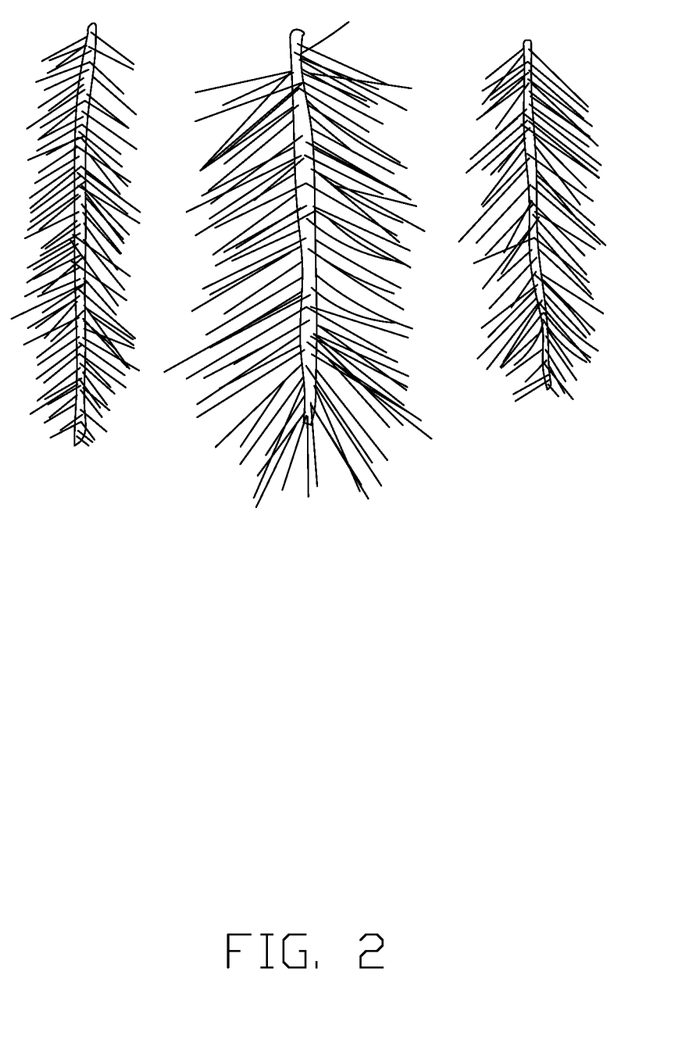
FIG. 2 is a schematic view of stimulated leaves (with branches) applied to an artificial plastic Christmas tree according to an embodiment of the present disclosure.
Figure 3:
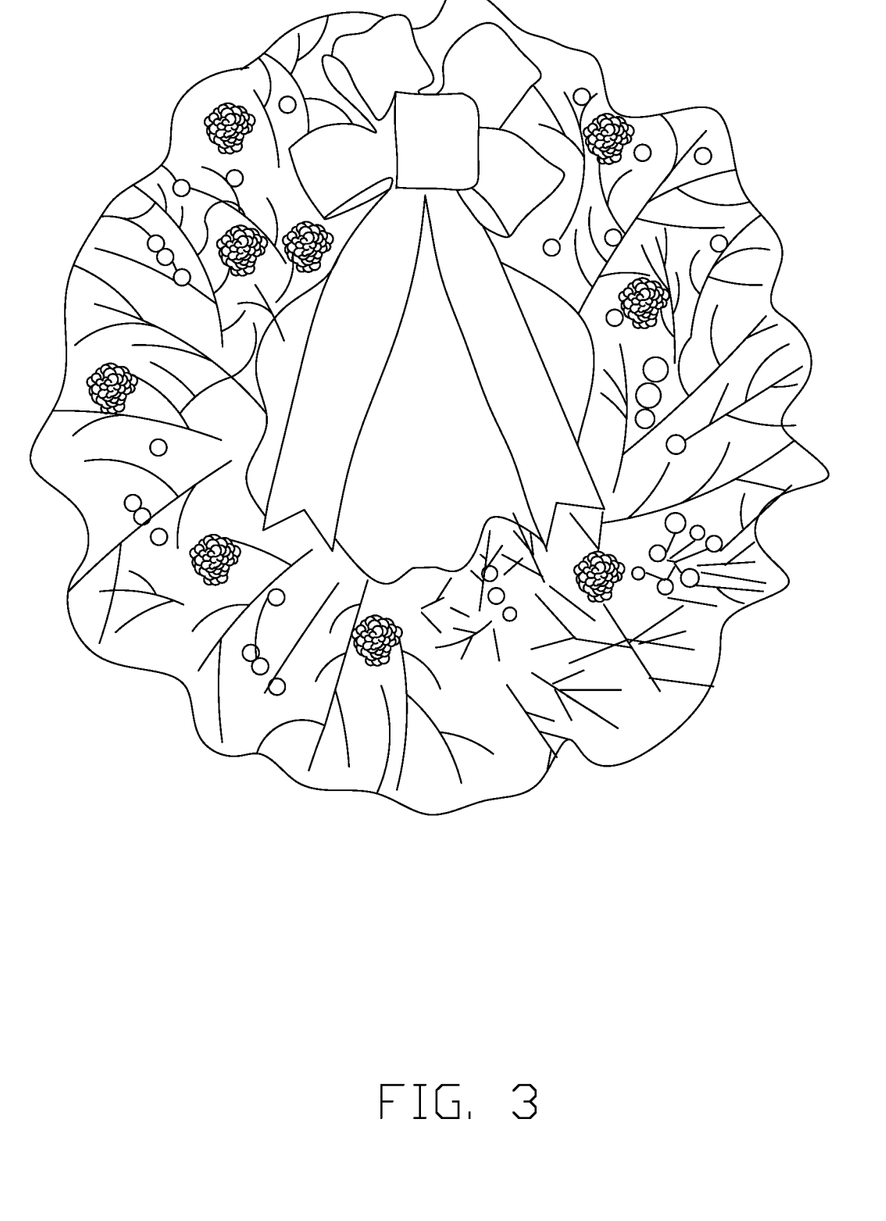
FIG. 3 is a schematic view of an artificial plastic Christmas wreath according to an embodiment of the present disclosure.
Figure 4:
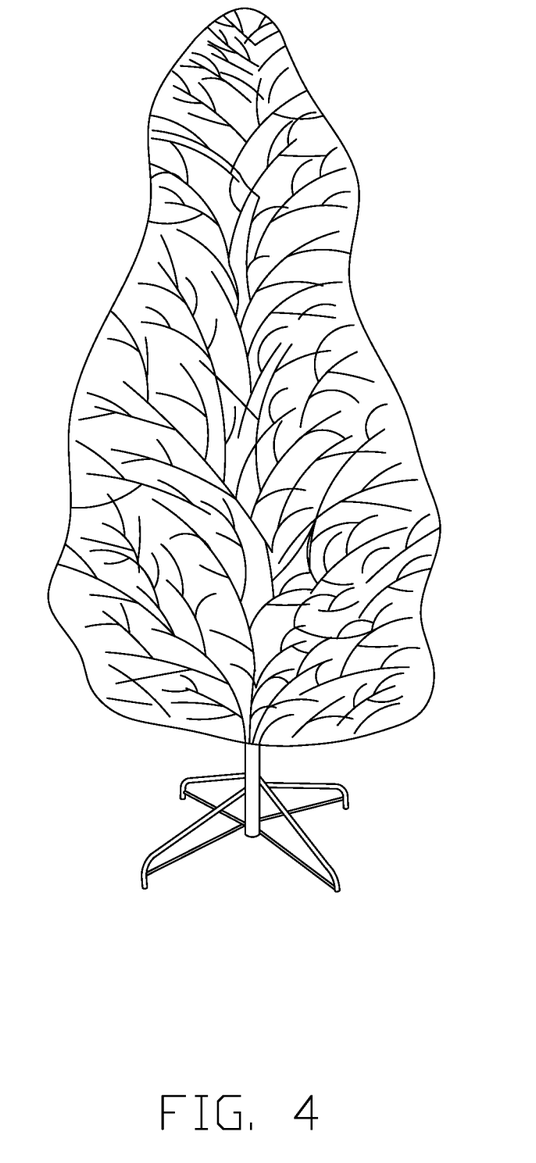
FIG. 4 is a schematic view of an artificial plastic Christmas tree according to an embodiment of the present disclosure.
Figure 5:
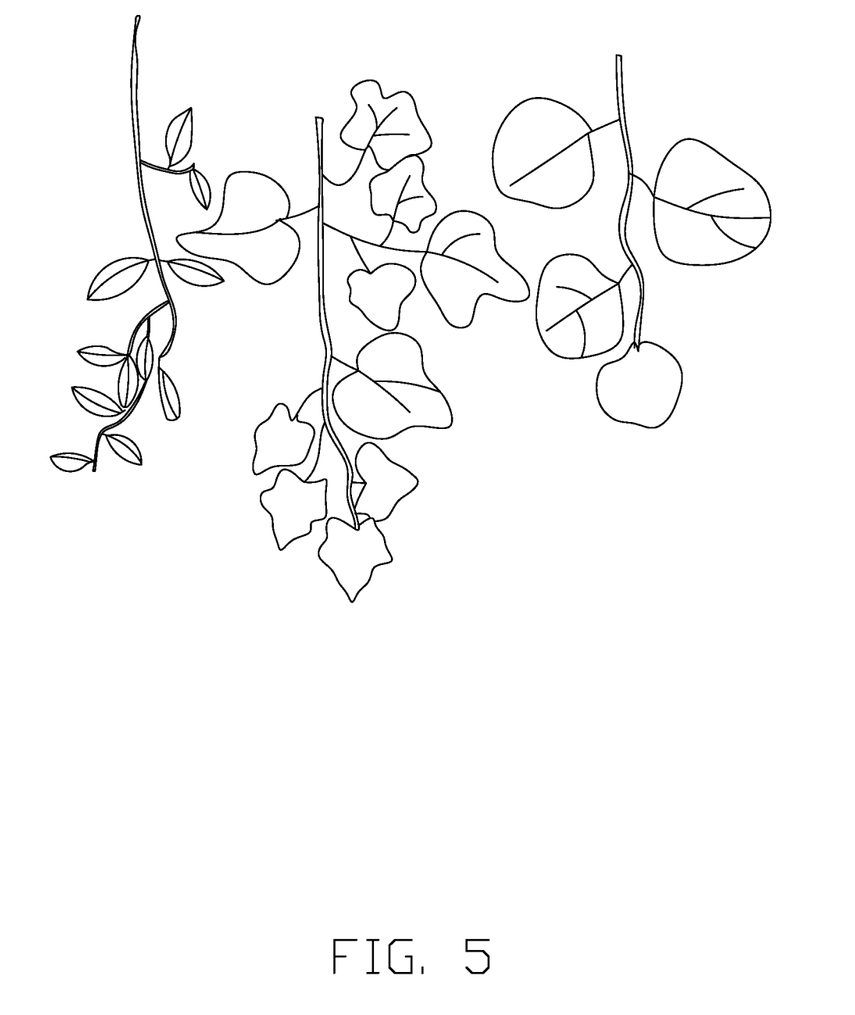
FIG. 5 is a schematic view of artificial plastic Christmas grass according to an embodiment of the present disclosure.
Figure 6:
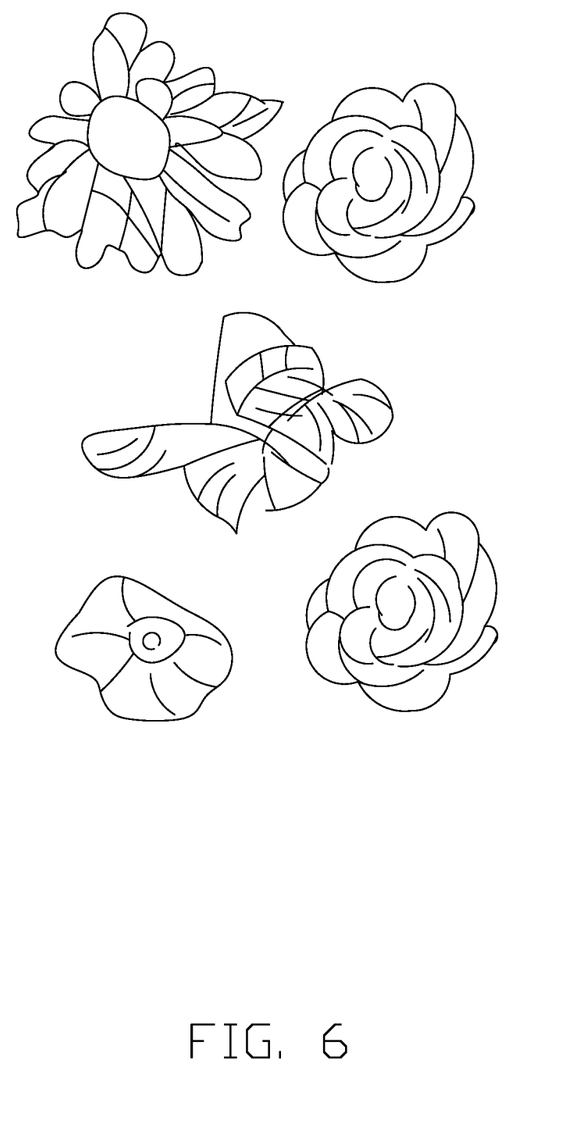
FIG. 6 is a schematic view of artificial plastic Christmas flowers according to an embodiment of the present disclosure.
Figure 7:
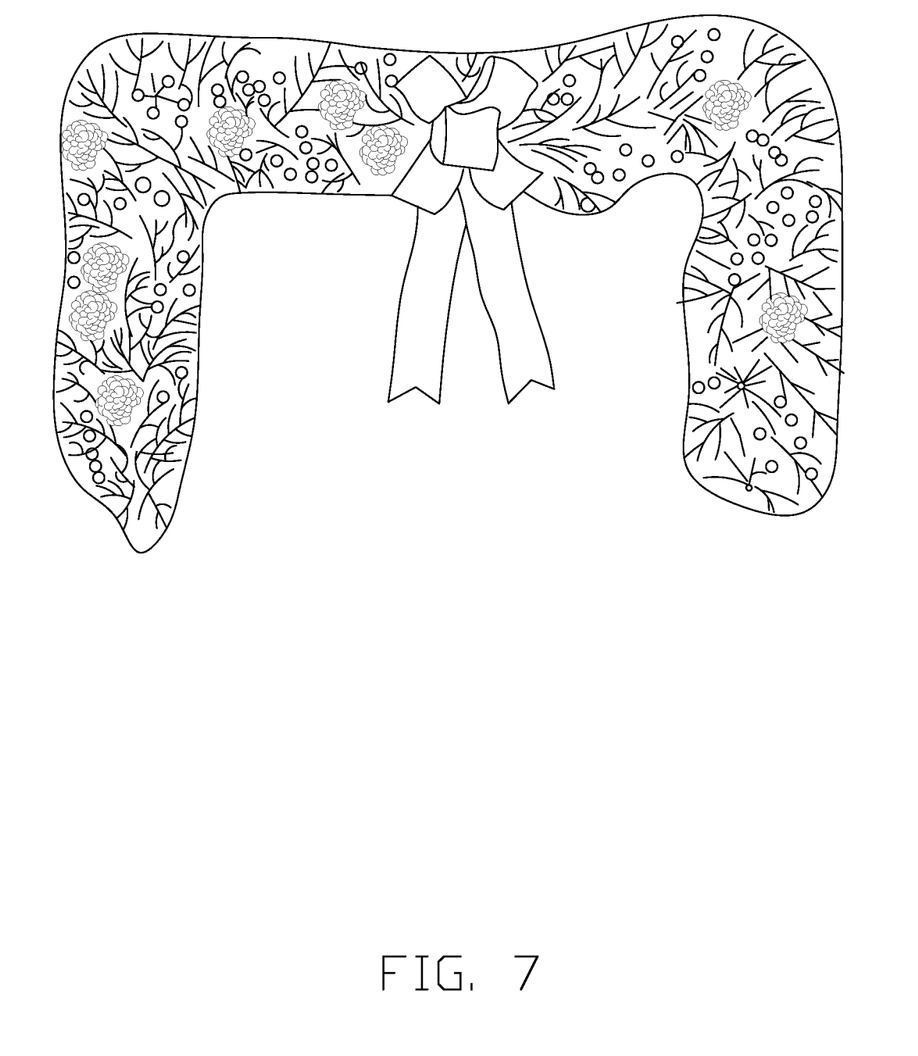
FIG. 7 is a schematic view of an artificial plastic Christmas rattan according to an embodiment of the present disclosure.

In addition, the application examples are with the flame retardant and fully biodegradable plastic ratio of Embodiment 3, according to the above extrusion method or injection molding method to make a variety of plastic decorations or its accessories, respectively, as follows: Application Example 1 is stimulated leaves applied to an artificial plastic Christmas tree, as shown in FIG. 1; Application Example 2 is stimulated leaves (with branches) applied to an artificial plastic Christmas tree, as shown in FIG. 2; Application Example 3 is the artificial plastic Christmas garland used to simulate leaves (with branches), see the attached FIG. 2;

Application Example 3 is an artificial plastic Christmas wreath, as shown in FIG. 3; Application Example 4 is an artificial plastic Christmas tree, as shown in FIG. 4; Application Example 5 is artificial plastic Christmas grass, as shown in FIG. 5; Application Example 6 is artificial plastic Christmas flowers, as shown in FIG. 6; Application Example 7 is an artificial plastic Christmas rattan, as shown in FIG. 7.

TABLE 1

Raw material ratios of Embodiments 1-4 and Comparisons 1-2

| Type of material | Specific material | Embodiment 1 | Embodiment 2 | Embodiment 3 | Embodiment 4 | Comparison 1 | Comparison 2 |
|---|---|---|---|---|---|---|---|
| Biodegradable plastic | PLA | 45 | 35 | 25 | 25 | 25 | 30 |
| | PBAT | 45 | 55 | 55 | 57 | — | 40 |
| | PBS | — | — | 10 | 10 | 10 | 13 |
| | PCL | — | — | — | — | 57 | — |
| Flame retardant | Decabromodiphenyl ether | 4 | 4 | 4 | 3 | 3 | — |
| | Diantimony trioxide | 4 | 4 | 4 | 3 | 3 | — |
| | Ammonium polyphosphate | — | — | — | — | — | 15 |
| Anti-oxidant | Anti-oxidant 1010 | 0.3 | 0.3 | 0.3 | 0.3 | 0.3 | 0.3 |
| Lubricant | Polyethylene wax | 0.2 | 0.2 | 0.2 | 0.2 | 0.2 | 0.2 |
| Compatibility agent | EVA 260 | 0.5 | 0.5 | 0.5 | 0.5 | 0.5 | 0.5 |
| Color powder | Green zeolite powder | 1 | 1 | 1 | 1 | 1 | 1 |
| Total (parts) | | 100 | 100 | 100 | 100 | 100 | 100 |

The above method of manufacturing the flame retardant and fully biodegradable plastic includes operations as followed.

1) formulation of raw materials: the formulated amount of PBS, PBAT and PLA are blended to make the biodegradable material.
2) Blending: Then the formulated amount of biodegradable material, flame retardant, anti-oxidant, lubricant and compatibility agent are blended. The flame retardant consists of decabromodiphenyl ether and diantimony trioxide.
3) Extrusion and granulation: extrusion and granulation are performed through a twin-screw melt extruder; the temperature of a rear section of a screw of the twin-screw extruder is set at 150-200° C.; a resulting pulling strip is cooled in water; granule-cutting is performed; drying is performed; thereby plastic pellets are obtained.

Effect Evaluation and Performance Testing

The performance tests of each embodiment include tensile strength, notched impact strength, flame resistance, heat resistance temperature, etc. The results are shown in Table 2. Among them, the notched impact strength is tested according to specific provisions of a national standard GB/T 1843-2008 (in China), and the flame resistance is tested according to specific provisions of a national standard GB/T 2408-2008 (in China).

TABLE 2

Comparison table of performance of specific embodiments

| | Embodiment 1 | Embodiment 2 | Embodiment 3 | Embodiment 4 | Comparison 1 | Comparison 2 |
|---|---|---|---|---|---|---|
| Tensile strength (Mpa) | 38.4 | 31.1 | 28 | 28.5 | 21.8 | 25.6 |
| Notched impact strength (KJ/m$^2$) | 9.6 | 18.3 | 22.2 | 25.9 | 21.3 | 6.2 |
| Flame resistance | HL94 V-2 | HL94 V-2 | HL94 V-2 | HL94 HB | HL94 HB | HL94 V-2 |
| Heat resistance temperature (° C.) | 55 | 55 | 65 | 65 | 63 | 66 |

As can be seen from Table 2, the tensile strength and notched impact strength of the plastic ornament of Embodiment 1 can meet the performance requirements of the plastic ornament, and the flame resistance performance is good, but the heat resistance is not enough. Compared with Embodiment 1, the impact strength of the plastic ornament of Embodiment 2 is further improved. Compared with Embodiment 2, the tensile strength and notched impact strength of the plastic ornament of Embodiment 3 can meet the performance requirements of the plastic ornament, and the flame resistance performance is good, and the heat resistance of the material is improved. In comparison with Embodiment 3, the flame resistance of plastic ornament in Embodiment 4 is reduced, the impact strength of the material increases, and the flame resistance deteriorates but still meets the requirements. The tensile strength and notched impact strength of the plastic ornament of Comparison 1 can meet the performance requirements of the plastic ornament, but the cost is nearly 100% higher than that of Embodiment 4, and the cost of the product is greatly increased. The flame resistance efficiency of Comparison 2 is low and the addition amount is high, resulting in a decrease in the impact strength of the material.

The above embodiments are only preferred embodiments of the present disclosure and cannot be used to limit the scope of the present disclosure. Any non-substantial changes and substitutions made by those skilled in the art on the basis of the present disclosure fall within the scope of the present disclosure.

What is claimed is:

1. A flame retardant and fully biodegradable plastic, prepared from following components with amount by weight:

a biodegradable plastic: 80-95 parts;
a flame retardant: 1-10 parts;
an anti-oxidant: 0.2-0.5 part;
a lubricant: 0.1-0.4 parts;
a compatibility agent: 0.3-1 parts; and
a color powder: 0-5 parts;
wherein the biodegradable plastic consists of polybutylene succinate (PBS), polybutylene terephthalate (PBAT), and polylactic acid (PLA), and the biodegradable plastic consists of 1 part by weight of the PLA, (1-2.5) parts by weight of the PBAT, and (0.2-0.5) parts by weight of the PBS; the flame retardant consists of decabromodiphenyl ether and diantimony trioxide, and the flame retardant consists of 1 part by weight of the decabromodiphenyl ether and (1-5) parts by weight of the diantimony trioxide.

2. The flame retardant and fully biodegradable plastic according to claim 1, wherein the anti-oxidant is selected from an anti-oxidant 1010 or an anti-oxidant 1076.

3. The flame retardant and fully biodegradable plastic according to claim 1, wherein the lubricant is selected from at least one of stearic acid, butyl stearate, oleic acid amide, ethylenebis-stearamide, paraffin wax, and polyethylene wax.

4. The flame retardant and fully biodegradable plastic according to claim 1, wherein the compatibility agent is selected from at least one of polyethylene-graft-styrene (PE-g-ST), polypropylene-graft-styrene (PP-g-ST), acrylonitrile butadiene styrene-graft-maleic anhydride (ABS-g-MAH), polyethylene-graft-maleic anhydride (PE-g-MAH), polypropylene-graft-maleic anhydride (PP-g-MAH), ethylene vinyl acetate (EVA), and ethylene butadiene alkaline (EBA).

* * * * *